United States Patent [19]

Szeremeta

[11] Patent Number: 5,642,943

[45] Date of Patent: Jul. 1, 1997

[54] SELF-ALIGNING AIR BEARING FOR USE WITH SERVO-TRACK WRITER

[75] Inventor: Wally Szeremeta, Mission Viejo, Calif.

[73] Assignee: Western Digital Corporation, Irvine, Calif.

[21] Appl. No.: 608,395

[22] Filed: Feb. 28, 1996

[51] Int. Cl.⁶ .................................................. F16C 32/06
[52] U.S. Cl. ............................................ 384/100; 384/108
[58] Field of Search .................................. 384/100, 108, 384/109

[56] References Cited

U.S. PATENT DOCUMENTS

| | | | |
|---|---|---|---|
| 3,875,589 | 4/1975 | Applequist et al. | 360/78 |
| 4,184,720 | 1/1980 | Zacherl | 384/109 |
| 4,318,572 | 3/1982 | Noha et al. | 384/108 X |
| 4,414,589 | 11/1983 | Oliver et al. | 360/77 |
| 4,531,169 | 7/1985 | Daniels | 360/98 |
| 5,172,981 | 12/1992 | Williams et al. | 384/108 X |
| 5,193,084 | 3/1993 | Christiaens | 369/258 |

FOREIGN PATENT DOCUMENTS

| 52054 | 4/1977 | Japan | 384/108 |
|---|---|---|---|
| 192555 | 2/1967 | U.S.S.R. | 384/108 |

*Primary Examiner*—Thomas R. Hannon
*Attorney, Agent, or Firm*—Leo J. Young; James A. Ward

[57] ABSTRACT

A self-aligning air bearing suited to stabilize a rotary structure having a height greater than the width of the structure. A substantially round sleeve is located in a central chamber formed between a mated top and bottom race. An air gland mounted within the sleeve is disposed to receive a journal shaft fixed to the rotary structure, forming an air bearing interface between the shaft and gland when pressurized air is introduced. The sleeve is free within the central chamber to move and align with the axis of rotation of the rotary structure when the air enters the gland but may then be locked into its adopted alignment. The air bearing is particularly useful for supporting a distal end of an extended rotary apparatus in a system for writing servopatterns to the disk surfaces within a plurality of aligned head-disk assemblies (HDAs).

21 Claims, 7 Drawing Sheets

SELF-ALIGNING AIR BEARING FOR USE WITH SERVO-TRACK WRITER

CROSS-REFERENCES TO RELATED APPLICATIONS

This application is related by subject matter and inventorship to the commonly-assigned U.S. patent application Ser. No. 08/608,391 entitled *Servo-Track Writer Apparatus for Multiple Disk Drives* fled concurrently herewith by W. Szeremeta and entirely incorporated herein by this reference.

BACKGROUND OF THE INVENTION

1. Field of the Invention

This invention relates generally to air bearings and particularly to a self-aligning air bearing for rotationally supporting an extended rotatable disk drive servowriting apparatus.

2. Description of the Related Art

Success in the disk drive industry requires meeting market demand for increased density at reduced cost. Profitability requires rapid time-to-market. The hard disk drive industry is widely known for its short product life cycles, rapid improvement and innovation, and fierce price competition in established products. These factors require storage capacity improvements that can be quickly carried out in many disk drives during manufacture without slowing production.

Considerable recent research and development effort has been directed toward producing disk drives capable of storing ever more data. At the approach of the popular personal computer trend, in the early 1980's, disk drive data storage capacities of 10 to 20 Megabytes were considered adequate. Currently, disk drive capacities of 840 Megabytes are used in notebook computers, while disk drive capacities of 1.6 Gigabytes and more are seen in desktop microcomputers. The demand for higher capacity disk drives shows no signs of abating and ever newer storage-hungry operating systems and applications appear likely to continue to fuel demand.

A trivial way to increase disk storage capacity is merely to increase the size and/or number of disk surfaces available for storing data. However this runs contrary to consumer demand for smaller disk drive volume, which necessarily limits the size and number of available storage disks. In particular, there is a continuing demand for ever smaller disk drives arising from the consumers' appetite for ever smaller notebook and laptop computers with ever larger data storage capacity.

One recognized way to satisfy both the demand for smaller size and the demand for larger storage capacity is to increase the areal recording density of the disk surfaces used to store data. The areal recording density of a disk surface is equal to the product of track density, expressed in tracks per millimeter (tpmm) or tracks per inch (tpi), and the linear bit density for each track, expressed in bits per millimeter (bpmm) or bits per inch (bpi). The track spacing decreases as track density increases so that available track density is usually limited by the available accuracy and precision of the radial read/write head positioning mechanism. As track density increases, more accurate positioning of the head over the centerline of the track is necessary to avoid inadvertently reading or writing in the wrong track. So, overall, high disk drive storage capacities require closely-spaced narrow tracks having high linear bit densities and the capability to position the read/write heads with great precision.

Data storage density is practically limited by the performance capacity of the servo-track writer (STW) apparatus employed to record head-positioning servo-patterns on the data storage surfaces of rotary disks during disk drive manufacture. The servo-patterns contain information that specifies physical data-track spacing and sector timing. Such information is precisely placed on the data storage surfaces during manufacture so that a read/write head can be accurately positioned to read and write data during disk drive operation. As disk drive storage capacities increase, head-positioning error tolerances decrease, requiring corresponding reductions in servo-pattern errors.

To appreciate the necessary head positioning accuracy, considering a numerical example is useful. For a disk surface with a track density of about 80 tpmm (2000 tpi), the space allocable to each track (track pitch) is about 12.5 microns (500 microinches). A typical design goal in such an application is to provide a total operational head positioning accuracy of 10% (±5%) of the track pitch, which limits positioning errors from all causes to less than about 1250 nanometers (50 microinches) in this example.

Available disk drive track density, which has historically increased about 60% every year, is now approaching 250 tpmm (6000 tpi). The necessary head positioning accuracy for 250 tpmm is about 4 microns (16 microinches). Practitioners long ago introduced closed-loop servo-positioning schemes that use head-positioning information written directly on the disk surfaces by a STW system during manufacture. During drive operation, a precision servosystem uses the recorded servo-positioning information to generate a feedback signal useful for properly placing the read/write head on the disk surface. Such servo-positioning information is called in the art a "servopattern." A feedback signal (servo data) generated in response to the servopattern read from the disk surface is used to drive an actuator motor that causes rotation about a pivot axis of an actuator arm to which read/write heads are attached, thereby positioning the heads with respect to the disk surface.

The recorded servopattern may, for instance, include a pattern of two analog burst signals, A and B, written between and spatially overlapping each data track pair. These servo signals are read by the positioned head and compared by the drive control circuitry to assess whether the head is centered on a data track (precisely between the two A and B servo burst signals). An error signal representing the difference in amplitude between the two servo burst signals is generated and used to drive the actuator in a direction that reduces the head position error. The servopattern may be either "embedded" on each disk surface or "dedicated" to one disk surface for use in head positioning for all other disk surfaces in the disk drive. Whether the servopattern is in embedded or dedicated, it must be precisely and accurately written by a STW system during manufacture before the disk drive can be used to store data.

The STW art can be appreciated with reference to, for instance, "*Servo Writers . . . the Pros and Cons of Different Approaches*" by Richard Freedland et at. (Proceedings of the Hewlett Packard Data Storage Symposium, 1991, Paper #7, pp. 7.1–7.19) and "*Servowriters: A Critical Tool in Hard Disk Manufacturing*" by Clayton Lee (*Solid State Technology*, May 1991, pp. 207–211). STW positioning accuracy is critical to hard disk manufacturing yields because even small servopattern position errors impair head positioning in modern high-density disk drives. Some portion of the operational head-positioning error is introduced as servopattern error by the STW itself because of alignment errors and imperfections in the recording system. These error contributions have until now been minor and practitioners in the art have merely tolerated the underlying STW imperfections. This is no longer acceptable with recent increases in track and bit densities.

Tolerable STW error contributions are typically limited to 10% of the entire operational tracking error budget for the disk drive. Recalling that total tracking error budget is typically 10% of track pitch, the STW system error contribution is then limited to 1% of the track pitch. In the above example, a disk drive wid a track density of about 80 tpmm (2000 tpi) has a track pitch of about 12.5 micrometers (500 microinches) and an operational head-positioning error budget of about 1250 nanometers (50 microinches). Accordingly, the STW system error contribution is limited to 125 nanometers (5.0 microinches). Similarly, STW system head-positioning error contributions are limited to 40 nanometers (1.6 microinches) in a disk drive having a track density of about 250 tpmm These STW positioning error limit calculations can be inverted to compute the maximum track density possible for a specified STW head-positioning error limit. For example, an STW system that contributes up to 125 nanometers (5.0 microinches) of head-positioning error cannot be used in the manufacture of disk drives having track densities over about 80 tpmm (2000 tpi), a value too low to satisfy existing market demands for high data storage densities.

Efforts to meet demands for greater storage density should not compromise existing capability to rapidly manufacture numerous disk drives. To avoid unacceptable losses in manufacturing volume, improvements in STW accuracy must be provided without reducing available rates of manufacturing throughput. Efforts of the industry to meet such needs have led to a well-known horizontally-oriented STW system capable of simultaneously writing servopatterns to more than one disk drive head-actuator assembly (HDA).

Reference is made to the above-cited Freedland and Lee references for a description of an existing horizontally-oriented STW system for multiple HDAs, which is now briefly described. Each of several HDAs is disposed within a separate sector of a flat table in the STW system Each HDA includes a read/write head fixed to the end of an actuator arm, which is disposed to pivot so that the read/write head follows an arcuate path about the actuator arm pivot axis. The actuator arm pivots responsive to an actuator motor during normal disk drive operation but is instead moved during STW operation by an engaging pin fixed to a rotary structure driven by a motor in the STW system A back bias current is applied to the actuator motor in each HDA to hold the actuator arm in place against the engaging pin. The rotary STW structure is supported by a base air bearing that defines a STW bearing axis about which the rotary STW structure rams. A retroreflector displacement sensor is fixed to the rotary STW structure for monitoring displacement during STW operation.

Rotation of the rotary STW structure moves each of several engaging pins in an arcuate path about the STW bearing axis. Engaging pin movement accordingly moves the corresponding HDA actuator arm about its pivot axis, which accordingly moves the attached read/write head in an arcuate path on a corresponding disk surface. Each engaging pin moves its read/write head by a distance that is precisely but indirectly measured by a laser transducing system, which includes a laser head, an interferometer, an optical receiver, and supporting electronics and also the retroreflector displacement sensor fixed to the rotary STW structure. The laser head sends a light beam through an interferometer where it is split into two beam, one beam to the retroreflector and back to the receiver and the other beam directly to the receiver. As the retroreflector moves, it changes the path length from laser head to receiver. In a well-known fashion, the receiver filters the arriving light through a polarizer and compares the phase difference between the direct beam and the reflected beam to create an electrical signal that includes retroreflector displacement information. If retroreflector displacement is mathematically related to read/write head displacement on a disk surface in a HDA, the electrical signal is then useful for precisely controlling the writing of a servopattern on the HDA disk surface.

Disadvantageously, in the horizontally-oriented STW system for multiple HDAs known in the art, each STW engaging pin and its corresponding HDA actuator arm rotate on different axes, producing unwanted angular displacement during STW operation that creates a "transmission error" in the STW head-positioning control system. Some head-positioning error is also contributed by the noise from frictional drag between pin and arm as the engaging pin pushes against its HDA actuator arm.

To solve some of these problems, the inventor created the vertically-extended rotary STW apparatus for multiple HDA servo-track writing to permit engaging pin and actuator arm axis alignment in the manner described in detail in the above-cited Szeremeta application and briefly hereinbelow with reference to FIG. 2. Szeremeta's vertically-extended rotary STW apparatus has a large height compared with its width, and therefore, unlike existing STW systems in the art, needs precisely-aligned rotational support at both the top and bottom ends to ensure rotary stability. As is known in the STW system art, frictional bearing noise contributes to head-positioning error and must be minimized by using a frictionless air bearing. Use of a single base air bearing is known in existing STW systems. However, any such frictionless bearing support added to the distal end of a vertically-extended rotary structure must also be precisely aligned with the STW bearing axis defined by the base bearing to minimize head-positioning error arising from bearing runout and to avoid component damage.

The problem of providing frictionless support for a rotary vertically-extended apparatus is a general problem with rotary machinery that is particularly critical in the STW art because of the sensitive head-positioning requirement. A mechanical component tolerance buildup in any system is known to skew rotary elements from a design axis. This is especially true in the STW art because clearances between rotational elements and stationary support elements, such as sleeves, are usually very small, particularly in frictionless bearings. A self-aligning bearing eliminates tolerance buildup problems but no self-alining bearing is known in the art that does not introduce significant frictional noise.

For example, U.S. Pat. No. 3,875,589 discloses a frictionless air bearing used to support a spindle that rotates a disk pack including a plurality of disks but the bearing is not self-alining. Also, U.S. Pat. No. 4,531,569 discloses a frictionless non-self-aligning air bearing combined with a rotary shaft for turning a recording disk pack. U.S. Pat. No. 5,193,084 discloses a frictionless axial air bearing used to support a recording disk turntable rotationally but the axial air bearing is combined with a non-frictionless radial bearing that alone is self-aligning.

There is accordingly no known source of a frictionless self-alining bearing, particularly a bearing offering both low friction and high alignment precision. Without such a self-aligning frictionless bearing, practitioners are obliged to accept either larger head-positioning errors from misaligned engaging pin axes or lower servopattern manufacturing rates. These unresolved deficiencies are clearly felt in the art and are solved by this invention in the manner described below.

SUMMARY OF THE INVENTION

This invention solves the above problem by providing a frictionless air bearing that is also self-aligning in the manner described below.

The self-aligning air bearing of this invention includes a bottom race and a top race configured to mate together and a sleeve that fits inside an internal chamber formed by mating the two races. An air gland fits in a bore within the sleeve. The air gland includes an internal cylindrical chamber for receiving a rotatable journal shaft. Air supply and delivery means are coupled to the combination of the race members, the sleeve, and the air gland. Pressurized air at a predetermined pressure is introduced by the delivery means into the cylindrical chamber formed by the air gland after the journal shaft is introduced into the chamber. The pressurized air causes the air gland and sleeve to move inside the chamber until the air gland is centered relative to the journal shaft. The centering action aligns the air bearing. It is preferable that the internal chamber be substantially conical and that the sleeve be substantially round to eliminate all but minimal contact with the sleeve during alignment. Once aligned, the sleeve may be locked in place by locking means.

The self-aligning air bearing of this invention is particularly useful for rotationally supporting an elongated servo-track writer (STW) system for simultaneously recording head-positioning servopatterns on the data storage surfaces of rotary disks in a plurality of head-disk assemblies (HDAs) during disk drive manufacture. The invention provides the low vibration and precise realignment necessary to reduce servopattern errors made during manufacture so that the related disk drive operational read/write head-positioning errors are also reduced.

The self-aligning air bearing is configured to align precisely with the base STW bearing axis without introducing friction. This is preferably accomplished by coupling the self-aligning air bearing to a journal shaft fixed to the rotary STW apparatus such that the journal shaft freely rotates in a substantially frictionless manner on a film of air introduced by other means into the air gland. This avoids misalignment or friction that may introduce head-positioning errors during STW system operation.

It is an advantage of this invention that it provides a bearing that is self-aligning.

It is another advantage of this invention that it provides a substantially frictionless support member.

It is yet another advantage of this invention that it provides precise self-alignment capability.

These and other objects, features and advantages of this invention can be better appreciated with reference to the following detailed description and the accompanying drawing.

BRIEF DESCRIPTION OF THE DRAWING

For a more complete understanding of this invention, reference is now made to the following detailed description of the embodiments illustrated in the drawing, wherein:

FIGS. 3a and 3b are plan views of an exemplary embodiment of the frictionless self-aligning air bearing of this invention in which FIG. 3a is a top plan view and FIG. 3b is a cross-sectional plan view taken along sectional lines 3b—3b of FIG. 3a;

FIGS. 5a, 5b, and 5c are plan view schematics of the top race component of the self-aligning bearing of FIGS. 3a and 3b in which FIG. 5a is a top view, FIG. 5b is a side view, and FIG. 5c is a cross-sectional side view taken in plane 5—5 of FIGS. 5a–b;

DETAILED DESCRIPTION OF THE PREFERRED EMBODIMENT

Figure 1:
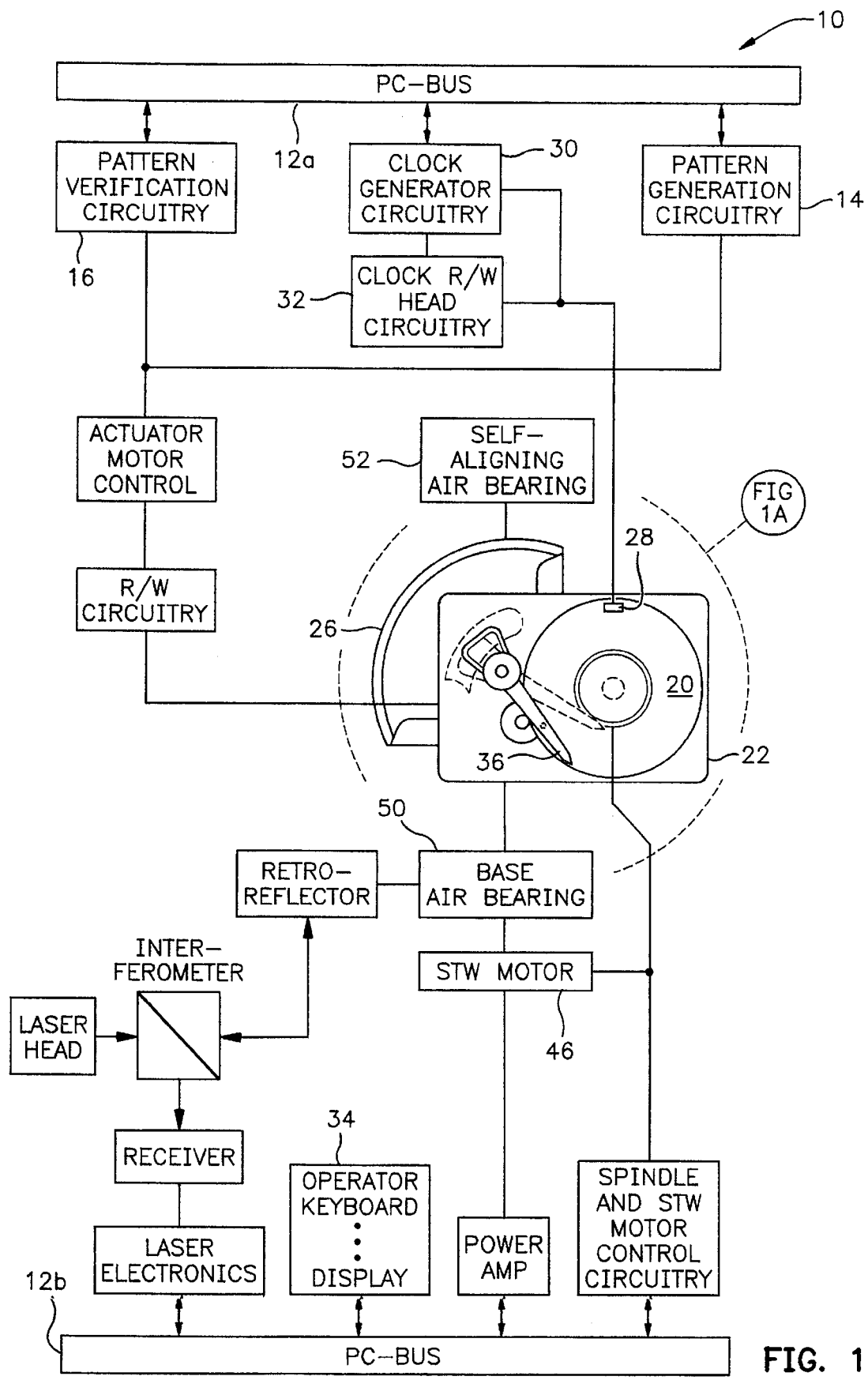
FIG. 1, including detail
Figure 1A:
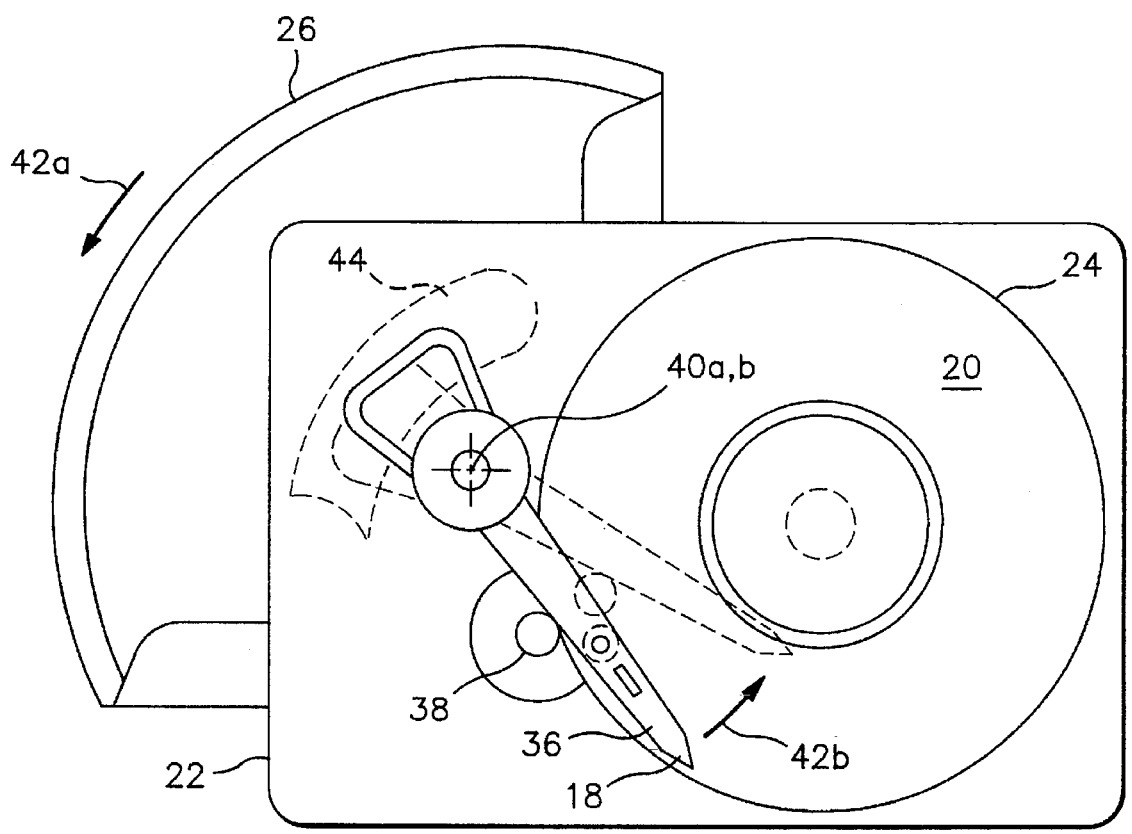
FIG. 1a, is a block diagram of an exemplary embodiment of a servo-track writing (STW) system including the frictionless self-aligning air bearing of this invention.

The self-aligning bearing of this invention is particularly suited for use in a servo-track writer (STW) system such as the STW system 10 shown in FIG. 1, which is adapted to record head-positioning servopatterns on the data storage surfaces of rotary disks during HDA manufacture in a manner now briefly described. PC-Bus 12a and 12b are used to carry STW system signals and are arbitrarily shown as two buses. The servopattern generator circuitry 14 and the servopattern verification circuitry 16 are used to create and test the servopattern written by a head 18 to a disk surface 20 in the head-disk assembly (HDA) 22 shown in detail in FIG. 1a. STW system 10 can write simultaneously to a plurality of disk surfaces on a plurality of HDAs, but for the sake of simplicity only one HDA 22 having a disk 24 is shown. As suggested by FIG. 2, several HDAs 22a–c, each exemplified by HDA 22, may be simultaneously positioned in vertical alignment for engagement by a rotary push-tower apparatus 26. A clock read/write head 28 is controlled by the clock generator circuitry 30 and the clock head circuitry 32. Clock head 28 generates and writes a series of highly accurate pulses in a track called the "clock track" in the usual manner known in the art. Generally, the clock track is used for circumferential positioning of transitions used in servo-bursts and generally for synchronization. It is preferable that an operator keyboard and display 34 be provided in STW system 10 for use by a skilled technician to control and test the results of the clock track and servopattern recording operations before ending the process.

Referring again to FIG. 1, and FIG. 1a in particular, the system operational environment and the various component functions are now described. During servo-writing operation, read/write head 18 on the actuator arm 36 is positioned on surface 20 of disk 24 by an engaging pin 38 fixed to rotary push-tower apparatus 26, which moves in the arcuate path shown by the arrow 42a about a STW bearing axis 40a. Engaging pin 38 abuts and pushes actuator arm 36 around a pivot axis 40b defined by a pivot bearing (not shown) supporting actuator arm 36 with respect to an actuator motor 44 in a manner well known in the disk drive art. Thus, read/write head 18 moves along an arcuate path in the direction shown by the arrow 42b responsive to rotation of the STW motor 46 coupled through a drive shaft 48 to turn rotary push-tower apparatus 26 on STW bearing axis 40a, which is established by a nearly frictionless base air bearing 50. Rotary push-tower apparatus 26 engages from one to several HDAs 22a–c, which are all supported in alignment by a separate structure (not shown) such that pivot axis 40b in each HDA 22 is disposed coaxially with STW bearing axis 40a. Reference is made to the above-cited Szeremeta reference for a description of each of the several mechanical STW components, which are also described briefly hereinbelow with reference to FIG. 2.

Figure 2:
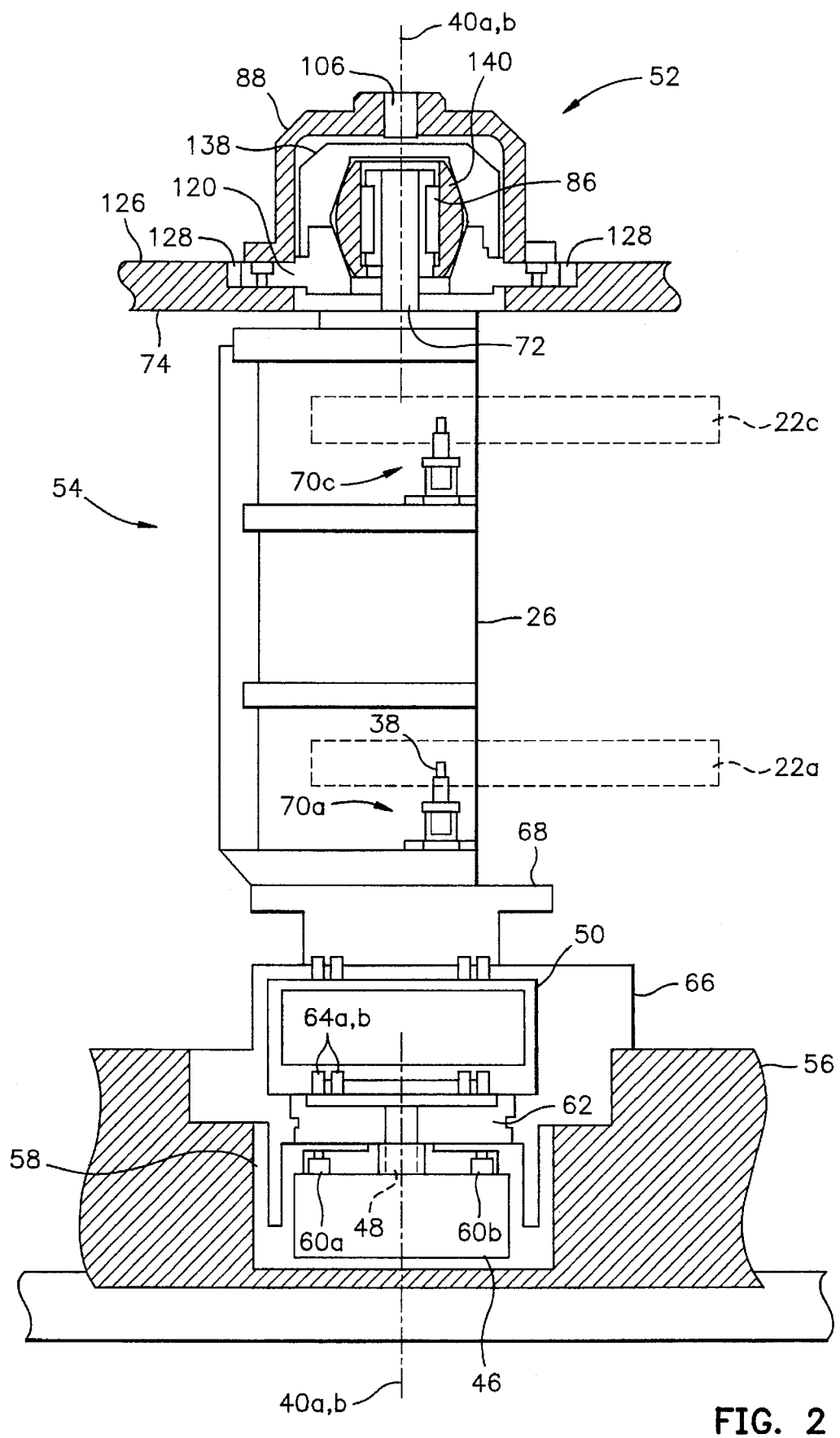
FIG. 2 shows an exemplary embodiment of the vertically-extended rotary STW apparatus for simultaneously writing servopatterns to a plurality of head-disk assemblies (HDAs) from the STW system of FIG. 1.

For the first time, the elongated shape needed for rotary push-tower apparatus 26 to engage multiple HDAs stacked in axial alignment in STW system 10 requires precisely-aligned frictionless rotational support of the end distal to base air bearing 50, which alone is sufficient for existing horizontally-oriented STW systems. The inventor has critically recognized that such distal support must be as frictionless as possible to reduce head position errors arising from bearing friction noise and must be precisely realigned with STW bearing axis 40a of base air bearing 50 after installing a plurality of HDAs. Accordingly, a distal self-aligning air bearing 52 of this invention is disposed as shown in FIG. 2 to assume STW bearing axis 40a without any action other than application thereto of pressurized air. The necessary air pressure and supply means are not shown as many such means and their operation are well known to those skilled in the art. STW system 10 is more fully described in the above-cited Szeremeta application.

FIG. 2 is a schematic diagram showing a STW apparatus 54 suitable for use with STW system 10. STW apparatus 54 includes rotary push-tower apparatus 26, which engages several HDAs 22a–c that are supported in alignment by a separate structure (not shown). To limit the effects of external vibration, STW apparatus 54 is disposed in a massive foundation 56 of a material such as granite. Push-tower motor 46 is captured by an aperture 58 through foundation 56. A voice-coil motor is preferred for push-tower motor 46 because of the precision movement it offers, although a stepper motor can be substituted if high precision is available. Push-tower motor 46 is coupled by the fasteners 60a and 60b to an adapter 62 including the prongs 64a and 64b. Rotary motion is transferred via drive shaft 48 through adapter 62 to base air bearing 50.

Base air bearing 50 is coupled to push-tower motor 46 in any useful fashion known in the art. Base air bearing 50 can be a typical commercially-available air bearing, such as the model 3R manufactured by Professional Instruments Company of Minneapolis, Minn. Appropriate interfacing, air supply, and the like (not shown), are preferably provided in a manner known to a person skilled in the air bearing art. An air bearing housing 66 is designed to fit in a complementary recess of foundation 56 to provide a measure of stability to the components mounted on top of base air bearing 50. A push-tower mounting adapter 68 is provided to attach rotary push-tower apparatus 26 to base air bearing 50.

Thus, in FIG. 2, several HDAs 22a–c are each simultaneously engaged by one of a plurality of push pin assemblies 70a–c fixed to rotatable push-tower apparatus 26, each exemplified by push pin assembly 70a, which includes engaging pin 38. During the servo-writing cycle, STW motor 46 rotates push-tower apparatus 26 by way of drive shaft 48, causing push pin assemblies 70a–c to each push on a corresponding actuator arm 36 (FIG. 1). The motion is coordinated with a servo-writing system signal (not shown) so that each actuator arm moves across the corresponding active disk surface as the servo-writing operation progresses to its conclusion.

Rotary structures with a high vertical aspect ratio, such as push-tower apparatus 26, are unstable when supported only by a single base bearing, to a degree that significantly degrades servo-writing accuracy and precision. Rotational vibration, precession, external forces, and the like, affect the stability of the entire structure. This is why horizontal STW systems are preferred in the art. In rotary STW apparatus 54, these instabilities affect the positioning of push pin assemblies 70a–c and thereby introduce unacceptable position errors in the servopatterns written onto the disks.

Self-aligning air bearing 52 of this invention is introduced to solve these problems. As seen in FIG. 2, an upper shaft 72 is fixed to the top of push-tower apparatus 26. A bridge bar 74 is mounted by a suitable clamping adapter (not shown) to granite foundation 56. Bar 74 is aligned so that upper shaft 72 extends through an aperture 76 in bar 74, which is described more particularly below with reference to FIG. 4. Assembled self-aligning air bearing 52 is fixed to bridge bar 74. Upper shaft 72 is threaded through a central aperture 78 in the bottom race 80, through the reduced sleeve shaftway 82 (see FIG. 6), and through the central bore 84 (see FIG. 7) of the air gland 86. Clearance is provided between the wall of central bore 84 in air gland 86 and the outer surface of upper shaft 72, shown in phantom line in FIG. 7. That is, upper shaft 72 operates as a journal within self-aligning air bearing 52. Upper shaft 72 is centered on STW bearing axis 40a, which is also the axis assumed by self-aligning air bearing 52 because of the self-aligning feature now described.

Self-aligning air bearing 52 of this invention is now described with reference to FIG. 4. A bearing case 88 includes a housing 90 that describes a central chamber 92 as seen in FIG. 3b. A circumferential mounting flange 94 surrounds the open rim of housing 90. A series of interspaced cutouts 96 and bores 98 are provided through the peripheral surface 100 of mounting flange 94 for use in mounting self-aligning air bearing 52 as described hereinbelow. A central threaded aperture 102 is provided in the crown region 104 of housing 90. Aperture 102 is adapted to receive an externally-threaded locking device 106. Locking device 106 has a spring 108 loading a plunger 110 that protrudes from a lower end 112 of locking device 106. The top of locking device 106 has a slot 114 for mating with a screwdriver tool.

Figure 7:
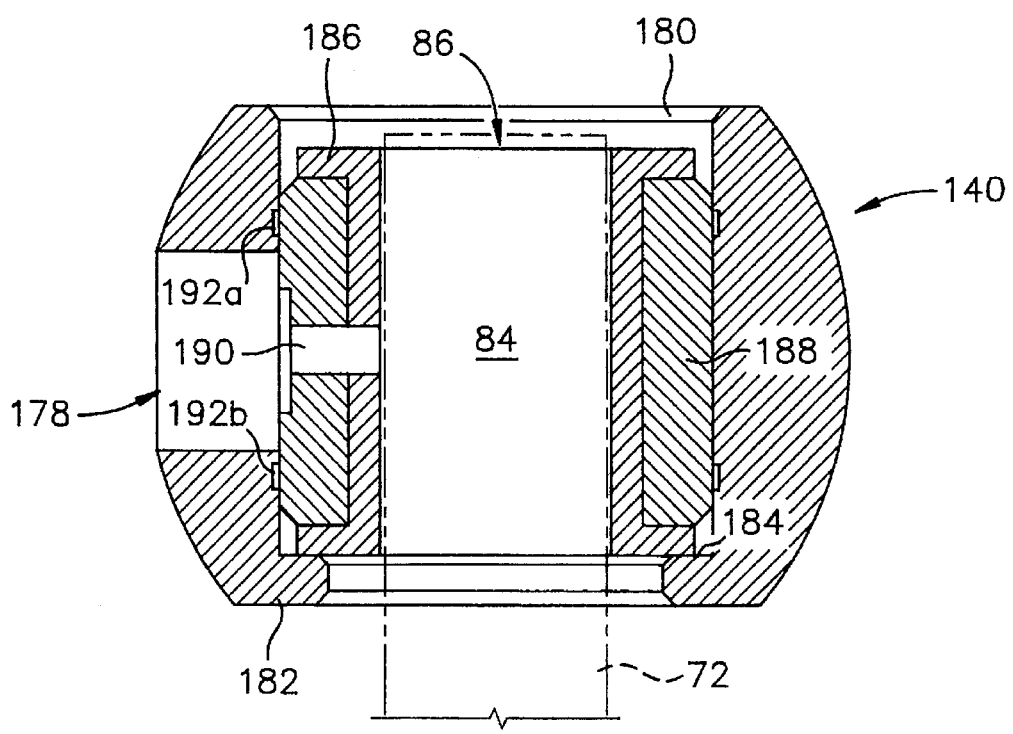
FIG. 7 is a cross-sectional side plan view of the bearing air gland of the self-aligning bearing of FIGS. 3a–b shown assembled with the sleeve of FIG. 6.

Housing 90 includes an aperture 116 (phantom line in FIG. 3a) for coupling an air supply conduit 118 (FIG. 3b) to provide air into central chamber bore 84 (FIG. 7).

Figure 3A:
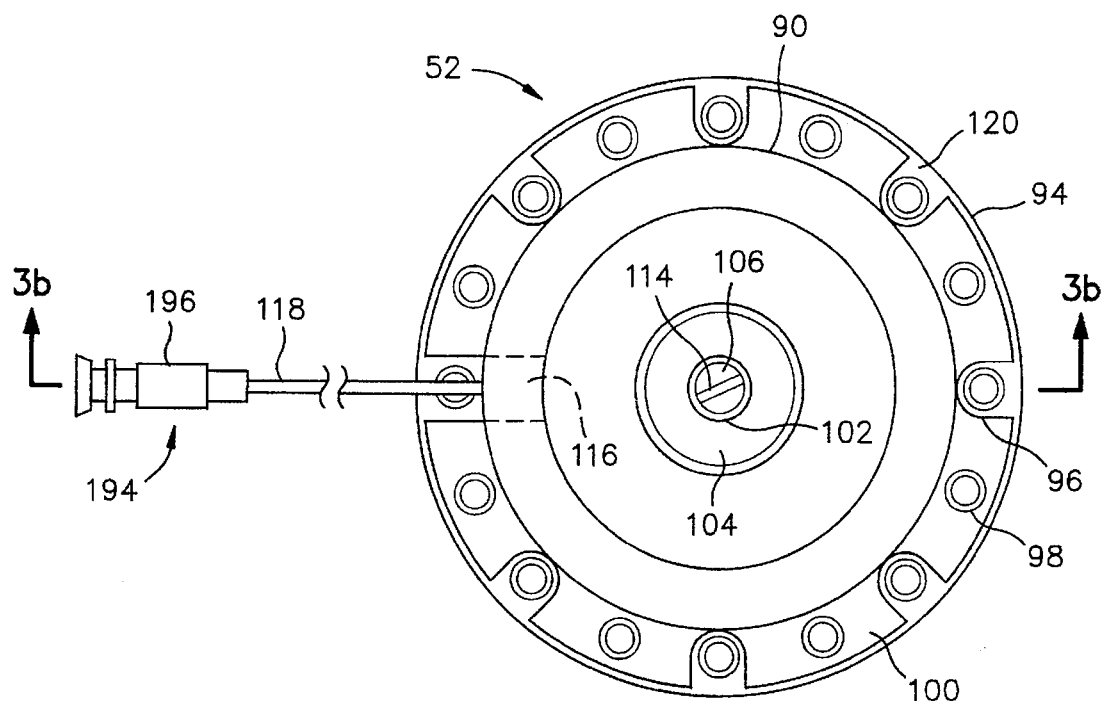
Figure 3B:
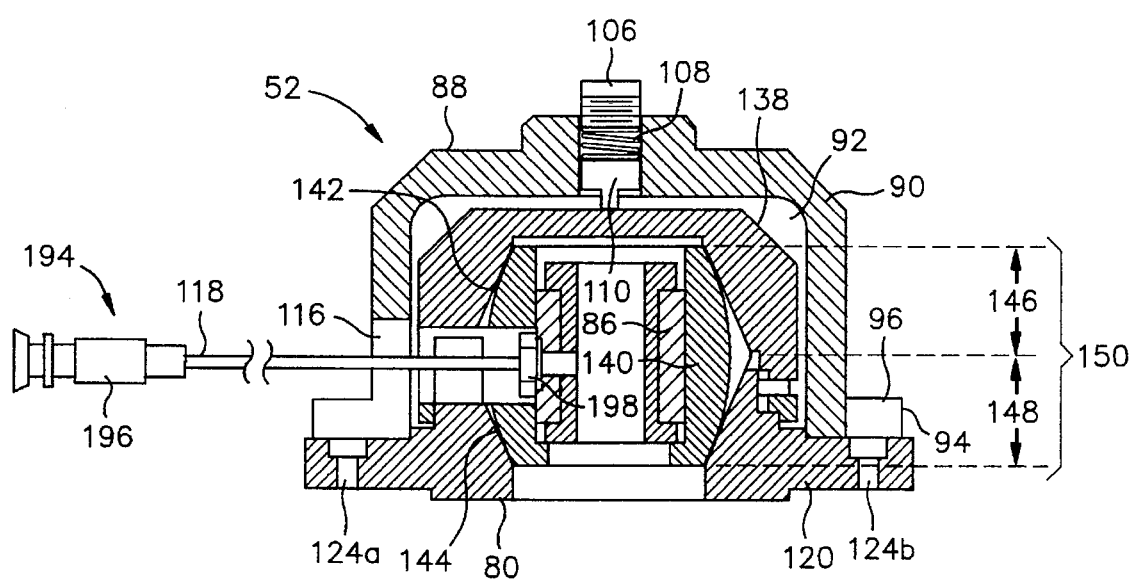
Figure 4:
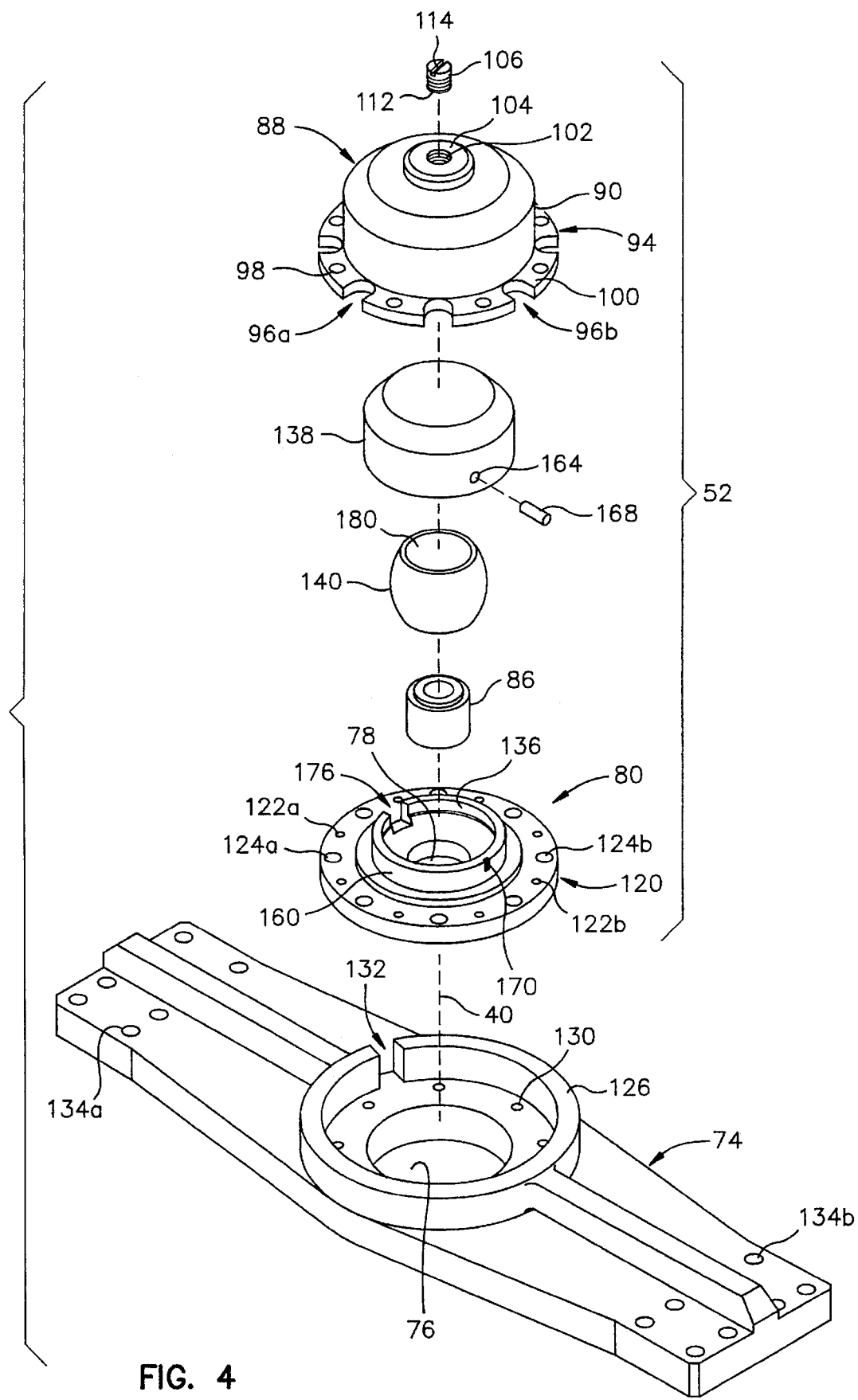
FIG. 4 is an exploded perspective view of the self-aligning bearing of FIGS. 3a–b, including an exemplary bridge bar for mounting the bearing to the exemplary rotary STW structure of FIG. 2.

Bottom race 80 is shown adapted for mating with housing 90 in FIG. 4 and FIG. 3b, which shows a view of self-aligning bearing 52 taken along sectional lines 3b—3b of FIG. 3a. Bottom race 80 includes a peripheral flange 120, having approximately the same outer diameter as mounting flange 94. A plurality of threaded bores 122 are disposed therein to match bores 98 in peripheral surface 100 of mounting flange 94. Housing 90 is coupled to bottom race 80 by fasteners (not shown) suitable for insertion through housing mounting-flange bores 98 for tightening down into threaded bores 122 in bottom race 80. Peripheral flange 120 in bottom race 80 preferably includes a plurality of capture bores 124. When bottom race 80 is coupled to housing 90, capture bores 124 are aligned with interspaced cutouts 96 in mounting flange 94. Capture bores 124 are each sized to receive a mounting bolt (not shown) therethrough for coupling bottom race 80 to a surface (not shown).

As an example of means for mounting self-aligning air bearing 52 to push-tower apparatus 26 of FIG. 2, FIG. 4 shows bridge bar 74 including a bearing-receiving adapter portion 126. FIG. 2 shows a clearance 128 between bottom race 80 and bridge bar 74 to provide room for realignment between adapter 126 and self-aligning air bearing 52.

Self-aligning air bearing 52 may be placed so that gravity is sufficient to hold it down during STW system installation. The threaded bores 130 are provided in bridge bar 74 for receiving fasteners (not shown) to hold self-aligning air bearing 52 to bridge bar 74 via capture bores 124 in bottom race 80. Bolts (not shown) may be used to hold self-aligning air bearing 52 to bridge bar 74. A gap 132 in adapter 126 permits passage of air supply conduit 118 (FIG. 3b). The holes 134 are used to couple bridge bar 74 to another structure.

In FIG. 4, central aperture 76 in exemplary bridge bar 74 allows access to self-aligning air bearing 52. Bottom race 80 includes central aperture 78 for alignment with central bridge-bar aperture 76 and for receiving upper shaft 72 therethrough. Bottom race 80 further includes an ascending bearing race 136 having internal shape and dimensions designed to receive a top race 138, air gland 86, and a sleeve 140.

FIG. 3b shows the preferred geometric relation of sleeve 140, which has a preferably round or spherical exterior, to the respective internal walls 142 and 144 of the mated top race 138 and bottom race 80. Inner wall 142 of top race 138 forms a conically-tapered chamber 146 (see also FIG. 5b) that mates with the opposed conically-tapered chamber 148 formed by inner wall 144 of bottom race 80. Together, the opposing conical chambers 146 and 148 form the single chamber 150 seen in FIG. 3b. Sleeve 140 moves slightly inside chamber 150 responsive to delivery of pressurized air from conduit 118 into chamber 150 unless fixed firmly in place by locking device 106. The usefulness of such sleeve 140 movement caused by the application of pressurized air is now described.

Figure 5A:
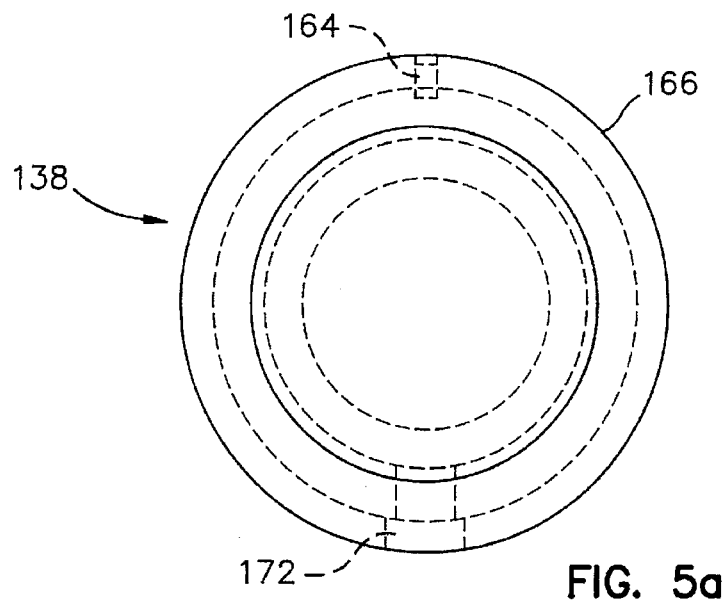
Figure 5B:
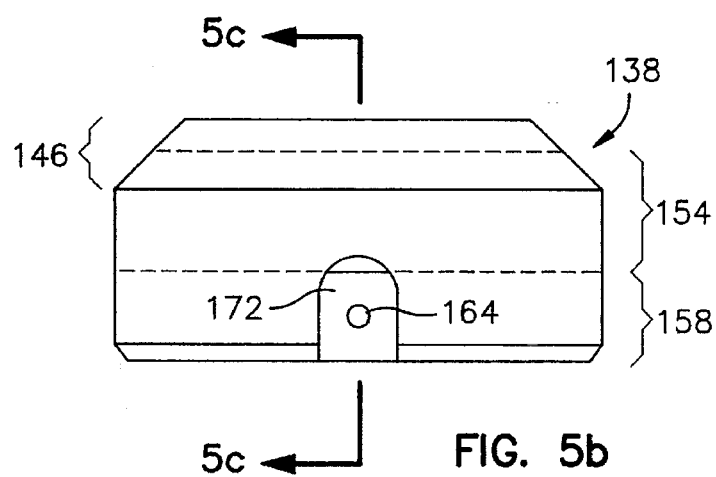
Figure 5C:
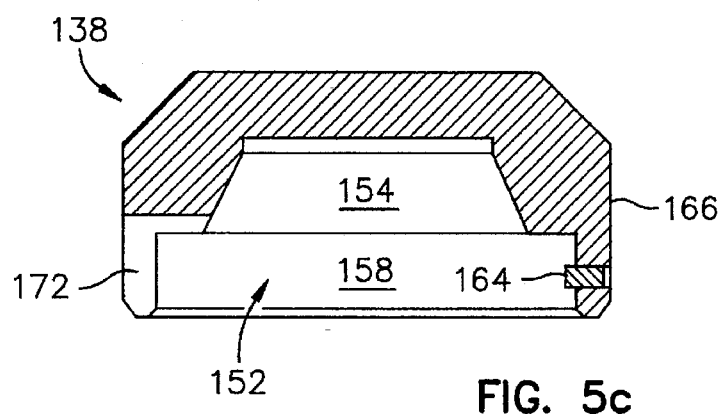

FIG. 5b shows top race 138 to be a cup-like shell having outer dimensions selected for a clearance fit within central chamber 92 of housing 90. FIG. 5c shows that the internal chamber 152 of top race 138 has a first region 154 shaped and sized to receive the upper portion 156 of sleeve 140 shown in FIG. 6. Sleeve 140 is preferably externally spherical. Top-race internal chamber 152 has a second region 158 adapted to receive therein the outer wall 160 of ascending bearing race 136 seen in FIGS. 3b and 4. Second region 158 is deep enough to receive the central portion 162 of sleeve 140 seen in FIG. 6.

FIGS. 5a and 5c show a first aperture 164 in the wall 166 of top race 138 for receiving a dowel pin 168 therethrough and into the mating depression 170 in outer wall 160 of bottom race 80 shown in FIGS. 3b and 4 for locking top race 138 into position. A second aperture 172 through wall 166 of top race 138 allows passage of air conduit 118 seen in FIG. 3b. Bottom race 80 is shaped and sized to complement top race 138 and to receive a lower portion 174 of sleeve 140 seen in FIG. 6. Ascending bearing race 136 has the aperture 176 shown in FIG. 4 for alignment with housing aperture 116 seen in FIG. 3b with second top-race aperture 172 seen in FIG. 3a and with a sleeve aperture 178 shown in FIGS. 6–7. This combination forms a passage from outside housing 90 to inside sleeve 140 for receiving air conduit 118 seen in FIG. 3b.

Figure 6:
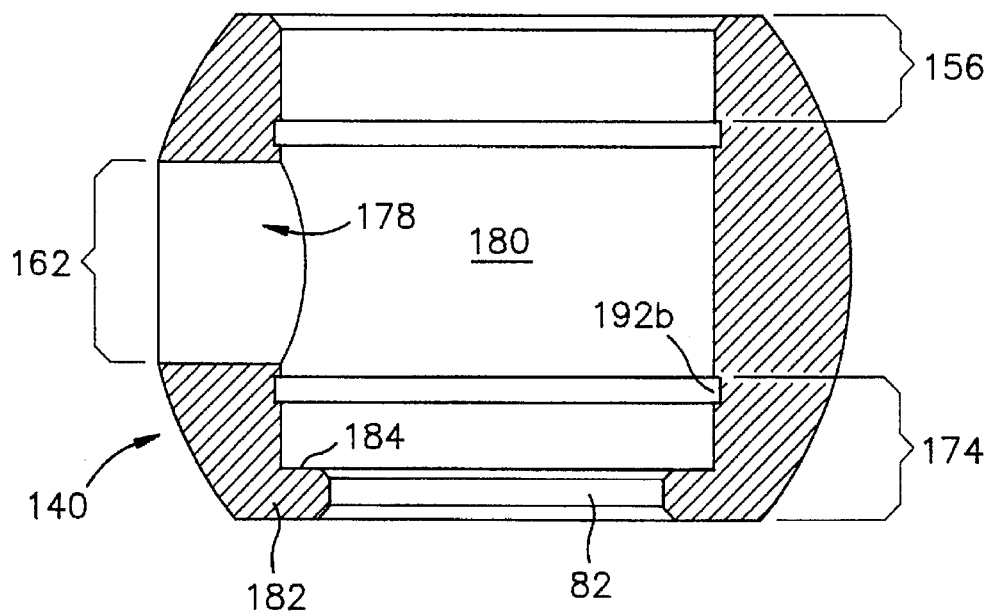
FIG. 6 is an enlarged cross-sectional side plan view of the sleeve of the self-aligning bearing of FIGS. 3a–b.

Sleeve 140 has a central shaftway 180 for receiving bearing air gland 86, as seen in FIG. 6. At the bottom of lower portion 174, FIG. 6 shows an inwardly-directed lip 182 providing a circumferential floor 184 within shaftway 180 for seating air gland 86, forming narrowed sleeve shaftway 82. That is, lip 182 extends inwardly to define the diameter of narrowed shaftway 82.

To allow unimpeded movement of sleeve 140 within chamber 150 formed by top and bottom races 138 and 80, these components are fabricated from stainless steel with highly polished surfaces for low-friction contact with each other during self-aligning operation. Unimpeded movement ensures precise realignment of sleeve 140 within chamber 150. However, once self-alignment is complete, there can be no movement between any of these members if sufficient air pressure is maintained. All bearing elements remain relatively fixed during bearing operation so that upper shaft 72 turns on a frictionless film of air supported between upper shalt 72 and air gland 86, as seen in FIG. 7 and now described.

FIG. 7 shows the assembly of sleeve 140 and air gland 86. Air gland 86 is preferably the commercially-available part (Model No. 7002) manufactured by Professional Instruments Co., Minneapolis, Minn. It is generally a graphite or brass cylinder 186 having a surrounding aluminum bushing 188 and central bore 84. An air-gland aperture 190 for air supply is disposed for alignment with the airway formed through housing aperture 116 (FIG. 3b), second top-race aperture 172 (FIG. 5a), and sleeve aperture 178. Air-gland aperture 190 continues the airway into central bore 84. Air gland 86 is affixed within shaftway 180 of sleeve 140 by the grooves 192a–b in the inner wall of sleeve shafthway 180 shown in FIG. 4. To provide a stress-free attachment, grooves 192a–b are filled with an adhesive (such as commercially-available LOCTITE™ RC/609 and LOC-QUIC™ 907 activator) before seating air gland 86 on lip 182 of sleeve 140 during manufacture.

FIG. 3b shows an air supply device 194 coupled to air gland 86 via a first air-supply coupling 196 having air conduit 118 leading from a pump (not shown) to a second air-supply coupling 198 adapted for secure mating with air-gland aperture 190 shown in FIG. 7. Requisite air pressure is determined by the operational application of this invention.

FIG. 3b shows the fully-assembled self-aligning air bearing 52 of this invention with attached air supply device 194. Before air pressure is applied to self-aligning air bearing 52, bottom race 80 should be loosened from bridge bar 74 (FIG. 4). Locking device 106 is also loosened in preparation for a self-alignment operation. Before rotating push-tower apparatus 26, upper shaft 72 is placed into central bore 84 of air gland 86 (FIG. 7). With self-aligning air bearing 52 thus loosely assembled in bridge bar adapter 126 and with upper shall 72 in place, pressure is supplied via air supply device 194 seen in FIGS. 3a—3b. Pressurized air enters air gland 86 within sleeve 140 and the self-alignment process proceeds as now described.

Although not wishing to be limited to any particular theory of operation, from his observations the inventor believes that the self-aligning feature of his invention arises from the principle that air pressurized within the innermost bore 84 of air gland 86 seeks a uniform steady-state flow. The inventor attributes this his understanding of "Bernoulli's principle" as discussed in academic textbooks on physics, such as, for example, *Understanding Physics*, by Issac Asimov, 1993 ed. When applying Bernoulli's principle to this invention, it should be appreciated that any misalignment or skewing of upper shall 72 within bore 84 creates an uneven air film between the circumferential boundary of upper shall 72 and inner walls of air gland 86. The varying film thickness creates differential pressure zones that operate to force the air film into uniform flow as pressure equalizes, according to Bernoulli's principle. To achieve a uniform flow, the air pressure forces sleeve 140 to reposition within chamber 150 until the air film has uniform thickness. When uniform flow is achieved, self-aligning air bearing 52 is accordingly realigned with upper shaft 72 and with STW bearing axis 40a.

Once aligned, bottom-race hold-down bolts (not shown) through capture bores 124 can be tightened into threaded bores 130. Afterwards, locking device 106 can be tightened against spring-loaded plunger 110 (see FIG. 3a) to push on top race 138 with force sufficient to give adequate radial stiffness to self-aligning air bearing 52. HDAs 22a–c may then be engaged with push-tower apparatus 26 and servo-writing begun.

Self-aligning air bearing 52 of this invention has been described in an implementation specifically adapted to a rotary vertically-extended apparatus for simultaneous servo-track writing in a plurality of HDAs. In the preferred embodiment, self-aligning air bearing 52 operates as a self-aligning follower bearing distal to a base air bearing 50, realizing to STW bearing axis 40a of base air bearing 50 upon application of air at a predetermined pressure. It may occur to a person skilled in the art that this self-aligning air bearing may be similarly adapted to other high aspect-ratio structures that require a frictionless self-aligning follower bearing. Thus, this invention is not to be limited except by the following claims. It is intended that the scope of the invention be defined by the claim and their equivalents.

I claim:

1. A self-aligning air bearing useful for supporting a journal shaft of a rotary apparatus having a center axis of rotation in a servo-track writer (STW) system for writing of servo-information in a plurality of tracks on a plurality of magnetic disk surfaces in a plurality of mounted head-disk assemblies (HDAs), the STW system including air supply means, the self-aligning air bearing comprising:

air delivery means coupled to the air supply means for delivering air at a predetermined pressure;

a bottom race having an inner annular shoulder defining upwardly sloping walls and an opening to allow passage of the air delivery means;

a top race configured to mate with the bottom race member, the top race having internal downwardly sloping walls and an opening to allow passage of the air delivery means, the respective sloping walls of the top race and the bottom race forming an internal chamber upon mating;

a sleeve disposed within the internal chamber and having an internal bore and an opening to allow passage of the air delivery means; and an air gland disposed within the cylindrical bore of the sleeve and having a second bore for receiving the journal shaft therethrough, the second bore having a center axis, the air gland being coupled to the air delivery means and having at least one opening for passing pressurized air into the second bore to create an air film for the substantially frictionless support of the journal shaft as it rotates, wherein the pressurized air causes the air gland and the sleeve to move within the internal chamber until the second bore center axis is aligned to coincide with the center axis of rotation.

2. The self-aligning air bearing of claim 1 further comprising:

in the top race, a cup-like shell; and in the bottom race, a flange for coupling the bottom race to at least one other member of the self-aligning air bearing.

3. The self-aligning air bearing of claim 2 further comprising:

a substantially dome-shaped bearing housing disposed over the top race and coupled to the bottom race flange.

4. The self-aligning air bearing of claim 3 further comprising:

locking means for applying a locking force to the sleeve to prevent sleeve movement within the internal chamber, thereby fixing the coincident alignment of the second bore center axis with the center axis of journal shaft rotation.

5. The self-aligning air bearing of claim 4 further comprising:

in the locking means, a spring-loaded plunger disposed to apply the locking force by applying to the top race a compressive force that is therefrom transmitted to the sleeve.

6. The self-aligning air bearing of claim 2 further comprising:

an adapter configured to couple the self-aligning air bearing to the rotary apparatus by providing means for sealing the housing and the top and bottom races, the seating means including means for affording the self-aligning air bearing with a predetermined degree of horizontal planar freedom with respect to the rotary apparatus.

7. The self-aligning air bearing of claim 1 further comprising:

in the bottom race, a first substantially conical space defined by the upwardly sloping annular shoulder of the bottom race; and in the top race, a second substantially conical space defined by the downwardly sloping walls of the top race, wherein the first and second substantially conical spaces together form when mated the internal chamber in which the sleeve moves freely during realignment of the second bore center axis with the center axis of journal shaft rotation.

8. In a servo-track writer (STW) system for writing servo-information simultaneously in a plurality of tracks on a plurality of magnetic disk surfaces in a plurality of aligned head-disk assemblies (HDAs), the STW system including an rotary apparatus for engaging the aligned HDA plurality during a servo-track writing operation, the rotary apparatus having a drive shaft at one end supported on a base bearing defining a center axis of apparatus rotation and having a journal shaft at the other end distal to the drive shaft having a center axis of journal rotation coincident with the center axis of apparatus rotation, the STW system including an air supply and air delivery means for delivering pressurized air at a predetermined pressure, a self-aligning air bearing for supporting the journal shaft distal to the base bearing, the self-aligning air bearing comprising:

a bottom race having an inner annular shoulder defining upwardly sloping walls and an opening to allow passage of the air delivery means;

a top race configured to mate with the bottom race member, the top race having internal downwardly sloping walls and an opening to allow passage of the air delivery means, the respective sloping walls of the top race and the bottom race forming an internal chamber upon mating;

a sleeve disposed within the internal chamber and having an internal bore and an opening to allow passage of the air delivery means; and an air gland disposed within the cylindrical bore of the sleeve and having a second bore for receiving the journal shaft therethrough, the second bore having a center axis, the air gland being coupled to the air delivery means and having at least one opening for passing pressurized air into the second bore to create an air film for the substantially frictionless support of the journal shaft as it rotates, wherein the pressurized air causes the air gland and the sleeve to move within the internal chamber until the second bore center axis is aligned to coincide with the center axis of journal shaft rotation.

9. The self-aligning air bearing of claim 8 further comprising:

in the top race, a cup-like shell; and in the bottom race, a flange for coupling the bottom race to at least one other member of the self-aligning air bearing.

10. The self-aligning air bearing of claim 9 further comprising:

a substantially dome-shaped bearing housing disposed over the top race and coupled to the bottom race flange.

11. The self-aligning air bearing of claim 10 further comprising:

locking means for applying a locking force to the sleeve to prevent sleeve movement within the internal chamber, thereby fixing the coincident alignment of the second bore center axis with the center axis of journal shaft rotation.

12. The self-aligning air bearing of claim 11 further comprising:

in the locking means, a spring-loaded plunger disposed to apply the locking force by applying to the top race a compressive force that is therefrom transmitted to the sleeve.

13. The self-aligning air bearing of claim 9 further comprising:

an adapter configured to couple the self-aligning air bearing to the rotary apparatus by providing means for seating the housing and the top and bottom races, the seating means including means for affording the self-aligning air bearing with a predetermined degree of horizontal planar freedom with respect to the rotary apparatus.

14. The self-aligning air bearing of claim 8 further comprising:

in the bottom race, a first substantially conical space defined by the upwardly sloping annular shoulder of the bottom race; and in the top race, a second substantially conical space defined by the downwardly sloping walls of the top race, wherein the first and second substantially conical spaces together form when mated the internal chamber in which the sleeve moves freely during realignment of the second bore center axis with the center axis of journal shaft rotation.

15. A self-aligning air bearing for supporting a journal shaft having an axis of rotation at first end of a rotary apparatus that is supported by a base bearing defining an axis of rotation at a second end distal to the first end, the rotary apparatus including air delivery means coupled to air supply means, the self-aligning air bearing comprising:

a bottom race having an inner annular shoulder defining upwardly sloping walls and an opening to allow passage of the air delivery means;

a top race configured to mate with the bottom race member, the top race having internal downwardly sloping walls and an opening to allow passage of the air delivery means, the respective sloping walls of the top race and the bottom race forming an internal chamber upon mating;

a sleeve disposed within the internal chamber and having an internal bore and an opening to allow passage of the air delivery means; and an air gland disposed within the cylindrical bore of the sleeve and having a second bore for receiving the journal shaft therethrough, the second bore having a center axis, the air gland being coupled to the air delivery means and having at least one opening for passing pressurized air into the second bore to create an air film for the substantially frictionless support of the journal shaft as it rotates, wherein the pressurized air causes the air gland and the sleeve to move within the internal chamber until the second bore center axis is aligned to coincide with the center axis of journal shaft rotation.

16. The self-aligning air bearing of claim 15 further comprising:

in the top race, a cup-like shell; and in the bottom race, a flange for coupling the bottom race to at least one other member of the self-aligning air bearing.

17. The self-aligning air bearing of claim 16 further comprising:

a substantially dome-shaped bearing housing disposed over the top race and coupled to the bottom race flange.

18. The self-aligning air bearing of claim 17 further comprising:

locking means for applying a locking force to the sleeve to prevent sleeve movement within the internal chamber, thereby fixing the coincident alignment of the second bore center axis with the center axis of journal shaft rotation.

19. The self-aligning air bearing of claim 18 further comprising:

in the locking means, a spring-loaded plunger disposed to apply the locking force by applying to the top race a compressive force that is therefrom transmitted to the sleeve.

20. The self-aligning air bearing of claim 16 further comprising:

an adapter configured to couple the self-aligning air bearing to the rotary apparatus by providing means for seating the housing and the top and bottom races, the seating means including means for affording the self-aligning air bearing with a predetermined degree of horizontal planar freedom with respect to the rotary apparatus.

21. The self-aligning air bearing of claim 15 further comprising:

in the bottom race, a first substantially conical space defined by the upwardly sloping annular shoulder of the bottom race; and in the top race, a second substantially conical space defined by the downwardly sloping walls of the top race, wherein the first and second substantially conical spaces together form when mated the internal chamber in which the sleeve moves freely during realignment of the second bore center axis with the center axis of journal shaft rotation.

* * * * *